July 12, 1949.　　　J. P. JOHNSON　　　2,475,840
VALVE STOP
Filed Feb. 21, 1945
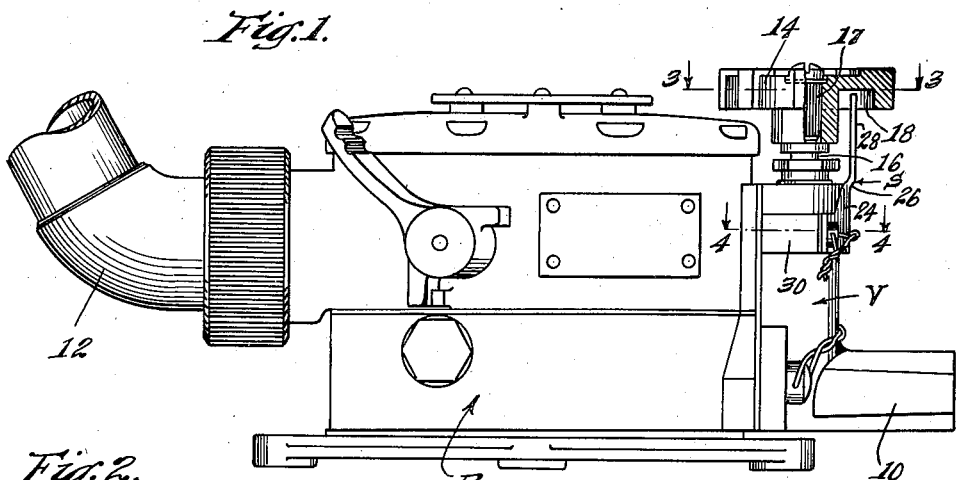
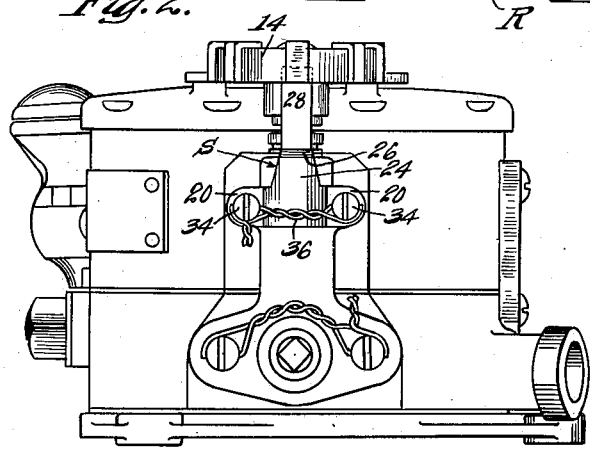
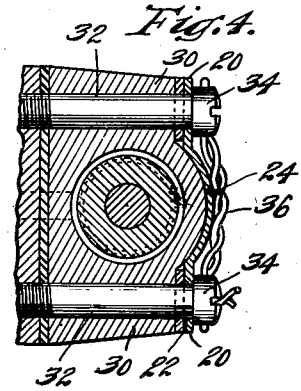
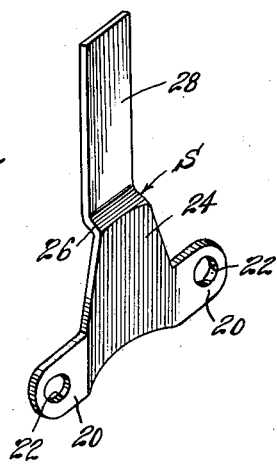
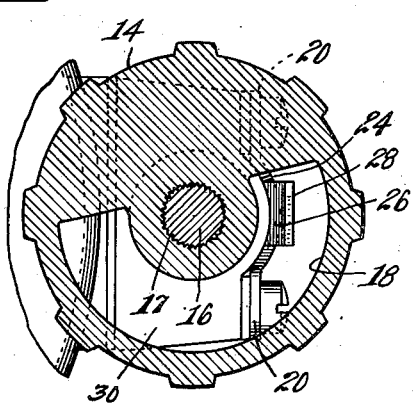
INVENTOR.
James P. Johnson,
BY Bair & Freeman
Atty's Patented July 12, 1949

2,475,840

UNITED STATES PATENT OFFICE 2,475,840

VALVE STOP

James P. Johnson, Cleveland, Ohio, assignor to The Aro Equipment Corporation, Bryan, Ohio, a corporation of Ohio Application February 21, 1945, Serial No. 579,062

1 Claim. (Cl. 251—153)

My present invention relates to a valve stop particularly adapted for use in connection with an oxygen regulator to prevent the user from opening the valve farther than necessary, which might result in accidental disassembly of the valve stem from the valve body.

One object of the invention is to provide a stop which can be applied to an existing regulator without any changes merely by mounting it thereon by means of two screws already provided on the regulator.

Another object is to provide a valve knob which is designed to coact with the valve stop in such manner that the desired amount of rotation is had and the rotation is effectively limited by the valve stop.

With these and other objects in view, my invention consists in the construction, arrangement and combination of the various parts of my device whereby the objects contemplated are attained, as hereinafter more fully set forth, pointed out in my claim and illustrated in the accompanying drawings, wherein:

Fig. 1 is a side elevation of an oxygen regulator to which my valve stop has been applied;

Fig. 2 is an end elevation thereof as looking from the right hand end of Fig. 1;

Fig. 3 is an enlarged sectional view on the line 3—3 of Fig. 1;

Fig. 4 is an enlarged sectional view on the line 4—4 of Fig. 1; and

Fig. 5 is a perspective view of the valve stop per se.

On the accompanying drawing I have used the reference character R to indicate generally the regulator, such as one of the kind used for mixing oxygen and air in proper proportions, which mixture is then inhaled by an aviator or the like. The oxygen inlet is shown at 10, and the mixed air and oxygen outlet at 12. Regulators of this kind usually have a valve V provided with a control knob 14 whereby oxygen can be admitted directly from the oxygen intake 10 to the interior of the regulator in the event that the regulating valve, usually provided between the oxygen supply and the regulator, is damaged, or otherwise becomes defective. It is undesirable, however, to permit this valve to be opened too far, or to be entirely unscrewed from the valve body, which would result in loss of the oxygen to atmosphere.

The knob 14 is mounted on a valve stem 16 which screws into the valve V, and the knob, in its under surface, has an arcuate recess 18. The recess 18 extends about half way around the knob, as shown in Fig. 3.

My valve stop, shown generally at S in Fig. 5, consists of a sheet metal stamping having a pair of perforated ears 20, the perforations being shown at 22, a curved portion 24, an offset portion 26, and an upwardly extending portion 28. The ears 20 are adapted to be mounted on bosses 30 of the valve V, which bosses are provided with holes 32 for receiving screws 34 to hold the valve in position. I use these same screws extended through the holes 22 to hold the stop S in position. A lock wire 36 is then threaded through holes in the screws to prevent undesirable loss of the screws.

My stop is simple to fabricate, and the only change necessary in the knob is that it be provided with the arcuate recess 18 to receive the portion 28 of the stop. The circumferential extent of the recess 18 may be increased or decreased, depending upon what the maximum degree of valve opening is to be. The stem 16 has a serrated connection shown at 17 in Fig. 3 so that the knob can be put on the stem in various adjusted positions. It is desirable, of course, to have the end of the recess 18 clear the edge of the stop portion 28 when the valve is in closed position, as in Fig. 3, and if the degree of opening is too great the knob can be changed at the serrations so that this spacing is wider and the throw from closed to open position is less.

Some changes may be made in the construction and arrangement of the parts of my device without departing from the real spirit and purpose of my invention, and it is my intention to cover by my claim any modified forms of structure or use of mechanical equivalents which may be reasonably included within its scope.

I claim as my invention:

In a stop for a valve of an oxygen regulator including a regulator body, a valve stem for said valve, a control knob for the valve having an arcuate recess therein, a stop arm, a pair of perforated ears on said stop arm for attachment to said regulator body, an arcuate portion on said stop arm fitting said regulator body, an extended portion on said stop arm entering said recess to limit the rotation of said knob to less than 360 degrees and a serrated connection between the valve stem and the valve knob, affording fine adjustment of the knob with relation to the stem.

JAMES P. JOHNSON.

REFERENCES CITED

The following references are of record in the file of this patent:

UNITED STATES PATENTS

| Number | Name | Date |
|---|---|---|
| 911,697 | Baum | Feb. 9, 1909 |
| 1,053,763 | Watson | Feb. 18, 1913 |
| 1,137,343 | McGivern | Apr. 27, 1915 |
| 1,746,055 | Roberts | Feb. 4, 1930 |

FOREIGN PATENTS

| Number | Country | Date |
|---|---|---|
| 53,641 | Switzerland | 1910 |
| 349,544 | France | 1905 |